United States Patent
Stevens et al.

(10) Patent No.: US 6,729,434 B2
(45) Date of Patent: May 4, 2004

(54) ELECTRICAL POWER ASSISTED STEERING SYSTEMS

(75) Inventors: Simon David Stevens, Birmingham (GB); Anthony Walter Burton, West Midlands (GB); Andrew James Stephen Williams, West Midlands (GB); John Nicholas Cheel, Birmingham (GB); Russell Wilson Jones, Warwickshire (GB)

(73) Assignee: TRW LucasVarity Electric Steering Ltd., West Midlands (GB)

( * ) Notice: Subject to any disclaimer, the term of this patent is extended or adjusted under 35 U.S.C. 154(b) by 0 days.

(21) Appl. No.: 09/895,918

(22) Filed: Jun. 29, 2001

(65) Prior Publication Data

US 2002/0017421 A1 Feb. 14, 2002

(30) Foreign Application Priority Data

Jun. 29, 2000 (GB) .............................. 0015832
Apr. 17, 2001 (GB) .............................. 0109320

(51) Int. Cl.⁷ ............................................. B62D 5/04
(52) U.S. Cl. ....................... 180/446; 701/41; 318/448
(58) Field of Search ...................... 388/907.5; 318/432, 318/433, 611, 448, 702; 701/41; 180/446, 443, 444

(56) References Cited

U.S. PATENT DOCUMENTS

| | | | | |
|---|---|---|---|---|
| 5,448,482 A | * | 9/1995 | Yamamoto et al. | 364/424.05 |
| 5,596,252 A | * | 1/1997 | Shimizu et al. | 318/432 |
| 5,612,877 A | * | 3/1997 | Shimizu et al. | 364/424.051 |
| 5,623,409 A | * | 4/1997 | Miller | 364/424.051 |
| 6,122,579 A | * | 9/2000 | Collier-Hallman et al. | 701/41 |
| 6,131,693 A | * | 10/2000 | Mukai et al. | 180/446 |
| 6,148,951 A | * | 11/2000 | Nishi et al. | 180/446 |
| 6,161,068 A | * | 12/2000 | Kurishige et al. | 701/41 |

FOREIGN PATENT DOCUMENTS

| | | |
|---|---|---|
| EP | 0416263 A1 | 3/1991 |
| EP | 0810143 A2 | 12/1997 |

* cited by examiner

*Primary Examiner*—Avraham Lerner
(74) *Attorney, Agent, or Firm*—Tarolli, Sundheim, Covell & Tummino L.L.P.

(57) ABSTRACT

An electric power assisted steering system is disclosed in which a torque demand signal (8) is generated and applied to an electric motor (1) operatively connected to a steering mechanism (5) in order to assist a driver of the vehicle when steering the vehicle. The torque demand signal (8) includes a damping component that is dependent upon a measurement of torque T carried by the steering mechanism and a measurement of the angular velocity ω of the steering mechanism. The torque produced by the motor (1) is not obtrusive during "hands-on" maneuvers but provides enhanced damping in other maneuvers such as a steering flick.

28 Claims, 5 Drawing Sheets

ELECTRICAL POWER ASSISTED STEERING SYSTEMS

This invention relates to improvements in electrical power assisted steering systems of the kind in which an electrical motor is adapted to apply an assistance torque to a steering component such as a steering column so as to reduce the driver effort required to control the vehicle.

In a simple electric power assisted steering system a torque sensor is provided which is arranged so that the level of torque in a steering column is measured. From this measurement a controller calculates the value of a torque demand signal which is indicative of the torque that is to be generated by an electric motor attached to the steering column. The motor applies a torque to the column of the same sense as that demanded by the driver and thus reduces the effort needed to turn the wheel.

A problem with this simple arrangement occurs in certain driving manoeuvres which excite a vehicle yaw mode transient response—leading to so-called "fish-tailing" of the vehicle. These manoeuvres are typically the result of "unsupported" driver actions on the handwheel such as rotational "flicks" where the drives applies a rapid handwheel angle change but does not follow it through with any substantial applied torque or perhaps releases the handwheel after initiating a rapid turn.

In such circumstances it is desirable that the handwheel returns to the central "straight-ahead" position quickly and with a minimum amount of overshoot or oscillation. In general, however, geometric and inertial effects of the steering system contribute to a free mode yaw response that is lightly damped and quite oscillatory—particularly at high vehicle speeds.

It is known in the art to overcome this problem by including a damping component within the torque demand signal that is used to drive the motor. This damping component in some sense mimics the mechanical phenomenon of viscous friction through software by generating a component of torque demand that is a function of the handwheel velocity. The damping component may generally increase in magnitude as a function of steering angular velocity from zero torque at zero rotational speed to a maximum at some arbitrary maximum speed. In effect, the damping component reduces the actual torque output by the motor, and hence the amount of assistance, in a particular instance when the velocities are high.

In accordance with a first aspect the invention provides an electric power assisted steering system comprising a steering mechanism which operatively connects a steering wheel to the roadwheels of the vehicle, a torque sensing means adapted to produce a first output signal indicative of the torque carried by a portion of the steering mechanism, a means for producing a second output signal indicative of the angular velocity of the steering wheel, an electric motor operatively connected to the steering mechanism, a signal processing unit adapted to receive the two signals and to produce a torque demand signal representative of a torque to be applied to the steering mechanism by the motor, and a motor drive stage adapted to provide a drive current to the motor responsive to the torque demand signal, and in which the torque demand signal includes a damping component that is dependent upon both the first output signal and the second output signal.

By making the damping component a function of torque as well as angular velocity of the steering column it has been found that the damping component does not become intrusive during "hands-on" slalom manoeuvres yet the damping remains effective in improving yaw response in other circumstances such as a steering flick.

The magnitude of the damping component preferably generally increases over a range of steering velocity values bounded by a first velocity and a second, higher, velocity. Thus, as steering velocity is increased more damping is introduced. The first velocity may correspond to zero column velocity. The second velocity may correspond to the maximum expected column velocity or some other arbitrarily selected value. Alternatively, a deadband may be provided whereby the damping component value remains at or about zero over a range of velocities bounding zero velocity. The width of this deadband may be varied in use, and may for example be varied as a function of vehicle speed or another measured parameter.

The magnitude of the damping component may generally increase linearly as a function of column velocity over the whole or a part of the range of values. Thus, the value of the damping component may become generally higher as the angular velocity of the steering wheel increases. However, a non-linear relationship may exist between velocity of the steering wheel and the damping component value.

In the preferred arrangement the rate of increase of the magnitude of the damping component between the first and second values preferably decreases as a function of applied torque. The damping component, in one arrangement, may be produced by generating a scaling value that is a function of torque, generating an intermediate damping value that is a function of column velocity, and multiplying the two values together to produce the damping component.

The scaling value may vary from a maximum value at zero applied torque to a minimum value at a predetermined maximum applied torque. In this case, for torque values at or above the maximum then a zero valued damping component will be produced.

The scaling value may be adapted to be substantially zero valued over a range of measured torque values bounding zero torque. This provides a deadband either side of zero torque about which for a given steering wheel velocity a maximum damping component is produced, improving steering feel for high speed on centre manoeuvres.

In a further refinement the width of the deadband may be varied as a function of the speed of the vehicle to which the steering system is fitted. A measurement of vehicle speed may therefore be provided to a third input of the signal processor.

The torque demand signal may include an assistance torque signal that is a function of torque in the steering mechanism. The assistance torque signal may generally increase with increasing torque applied by the driver. The signal processor may be adapted to produce the torque demand signal by combining the damping component with the assistance torque signal. Preferably the damping component is subtracted from the assistance torque signal.

The assistance torque signal may be a function of other variables such as vehicle speed.

The signal processor may calculate the value of the damping component for any given combination of torque and steering wheel velocity from entries in a look-up table. In this case, each or specific combinations of steering velocity and driver input torque will access a specified value stored in the table.

In a preferred alternative, the value of the damping component may be derived by entering the velocity, torque and optionally vehicle speed values into a suitable equation.

Whilst the provision of a damping component that is a function of torque as well as angular velocity of the steering column provides appropriate levels of damping during "hands-on" slalom manoeuvres it can, in certain circumstances, induce unwanted torque variations in the steering column shaft. For example, when a high frequency driver applied torque is generated, or the column kicks back due to impacts on the road wheels, the torque dependent damping component can interact with the applied torque setting up an unpleasant oscillation. Thus, the driver applied torque can affect the damping torque which in turn affects the driver applied torque and so on.

In a refinement, to ameliorate such an effect the damping component may be filtered to remove high frequency variations in the damping component caused by high frequency changes in the column torque. Thus, the system may include limiting means adapted to limit the rate of change of the damping component due to corresponding changes in column torque to a predetermined maximum rate.

Preferably, the rate limiting means may comprise a filter. This may comprise a lower pass filter, when in one arrangement may have a cut-off frequency of approximately 3 Hz (Hertz).

In a most convenient arrangement, where the damping component comprises the product of a scaling value that is a function of torque and an intermediate damping value that is a function of the column velocity, the limiting means may be arranged to limit the rate of change of the scaling value over time. The scaling value may be low-pass filtered prior to multiplication by the intermediate damping value to generate the damping component.

The low-pass filter may be a frequency domain filter but may be of any known kind, typically a discrete digital filter implemented on a microprocessor. Of course, any processing of the scaling value which limits the maximum rate of change of the scaling value over time could be employed.

There will now be described, by way of example only, one embodiment of the present invention with reference to the accompanying drawings of which:

Figure 1:
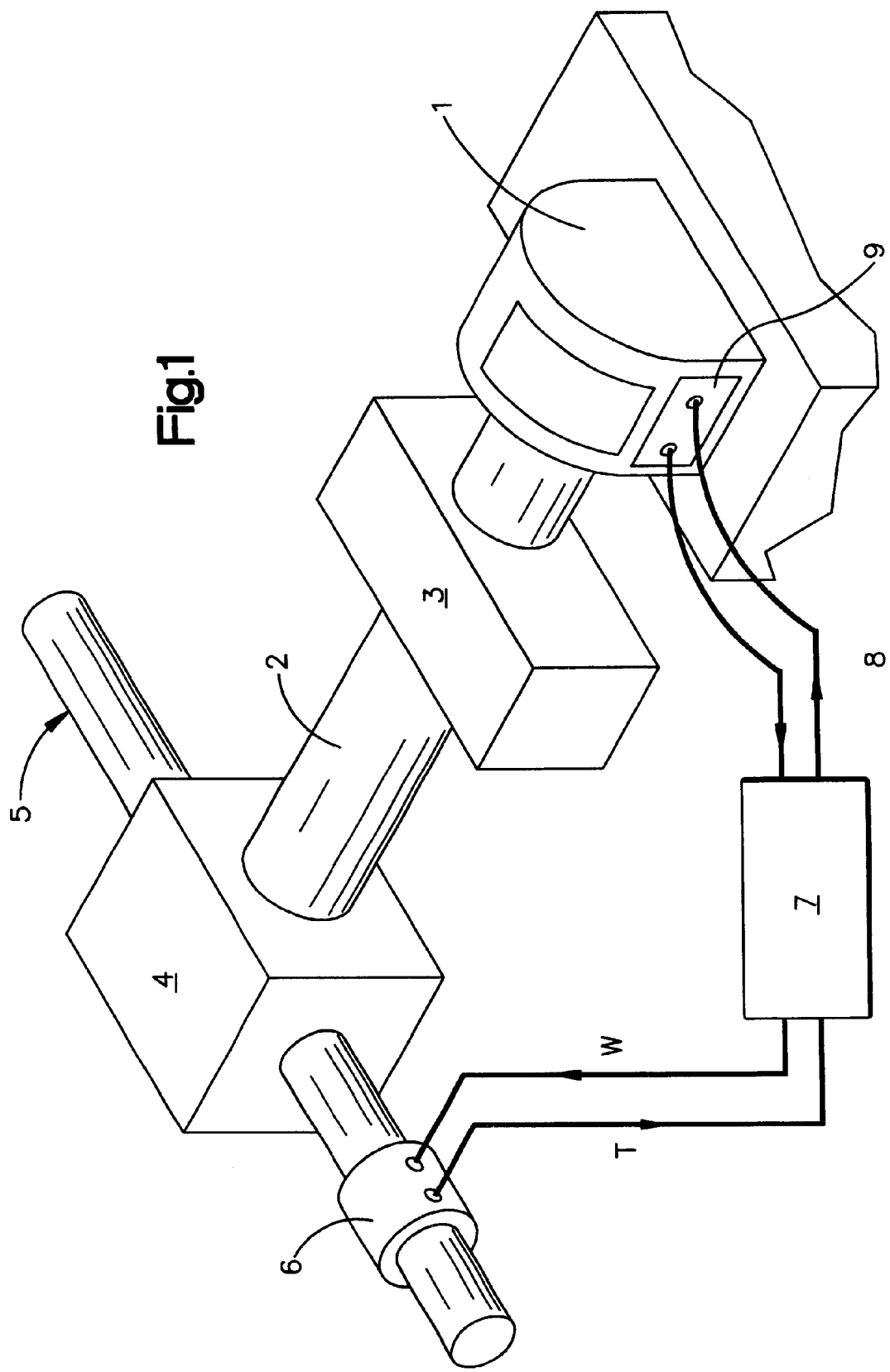
FIG. 1 is a schematic diagram of an electric power assisted steering system in accordance with the present invention.

An electric power assisted steering system is illustrated in FIG. 1 of the accompanying drawings. The system comprises an electric motor 1 which acts upon a drive shaft 2 through an (optional) gearbox 3. The drive shaft 2 terminates with a worm gear 4 that co-operates with a wheel provided on a portion of a steering column 5 or a shaft operatively connected to the steering column.

The steering column 5 carries a torque sensor 6 that is adapted to measure the torque carried by the steering column that is produced by the driver of the vehicle as the steering wheel (not shown) and hence steering column is turned against the resisting force provided by the vehicles road wheels (also not shown). The output signal T from the torque sensor 6 is fed to a first input of a signal processing unit 7.

An angular velocity sensor is also provided on the steering column shaft. As shown in FIG. 1 this is an integral part of the torque sensor 6. This produces an output signal indicative of the angular velocity ω of the shaft. The output from the velocity sensor is fed to a second input of the signal processing unit 7. This may comprise a electronic processor unit or other electronic circuitry.

The signal processing unit 7 acts upon the two input signals to produce, as its output, a torque demand signal 8 that is passed to a motor controller 9. The motor controller 9 converts the torque demand signal 8 into drive currents for the electric motor 1.

The value of the torque demand signal 8 corresponds to the amount of assistance torque to be applied to the steering column by the electric motor 1. The value will vary from a minimum value corresponding to maximum output torque for the motor in one sense, through zero torque when the demand signal is zero, to a maximum motor torque of the opposite sense.

The motor controller 9 receives as its input the torque demand signal and produces currents that are fed to the motor to reproduce the desired torque at the motor drive shaft 2. It is this assistance torque applied to the steering column shaft 5 that reduces the effort needed by the driver to turn the wheel.

Figure 2:
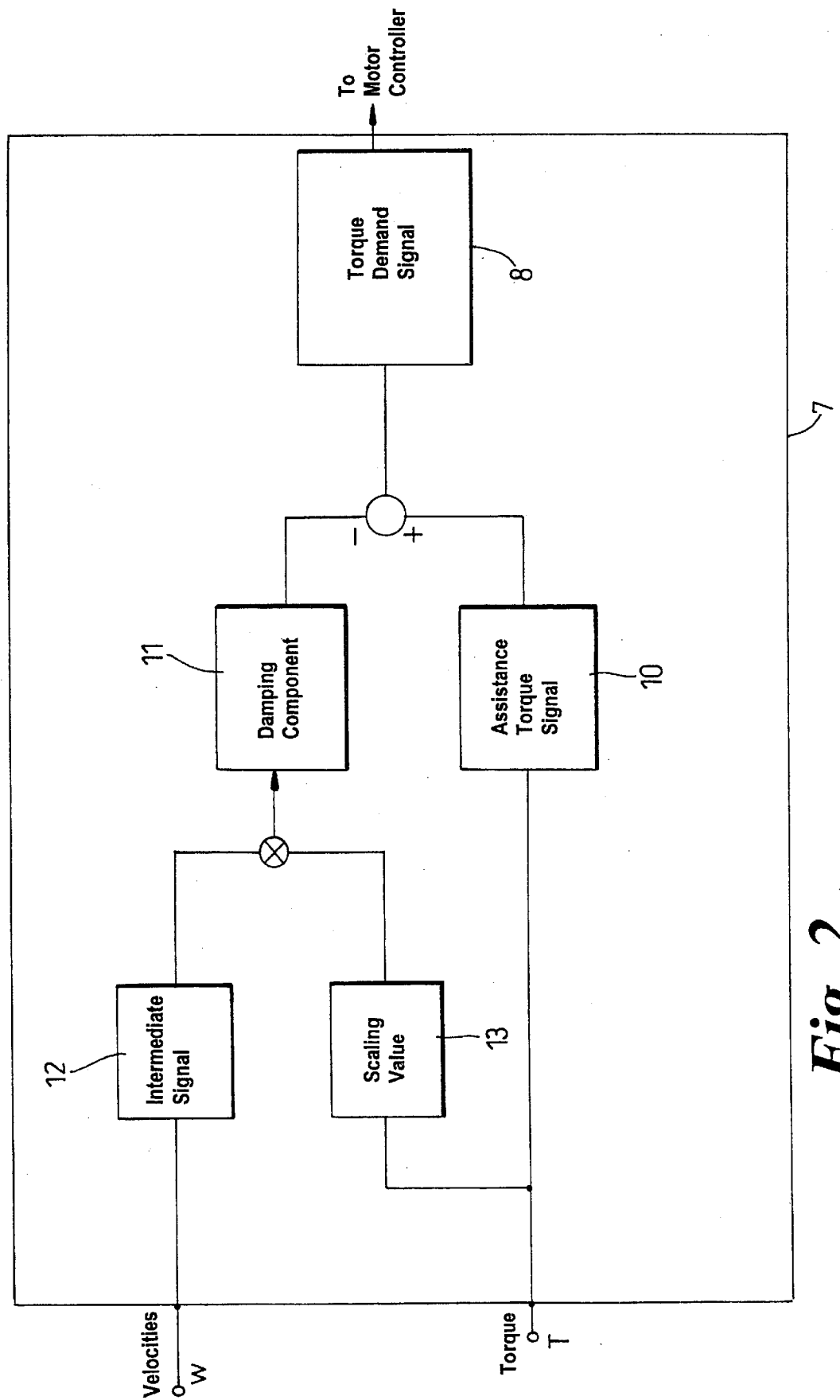
FIG. 2 is a block diagram illustrating the functional steps undertaken within the signal processing unit of the system of FIG. 1.

FIG. 2 illustrates the functional steps undertaken by the signal processing unit 7 in producing the torque demand signal 8. It can be seen that the torque demand signal 8 is produced as two components: an assistance torque signal 10 and a damping component 11. These two components 10,11 are combined within the signal processor to form the final torque demand signal 8.

Figure 3:
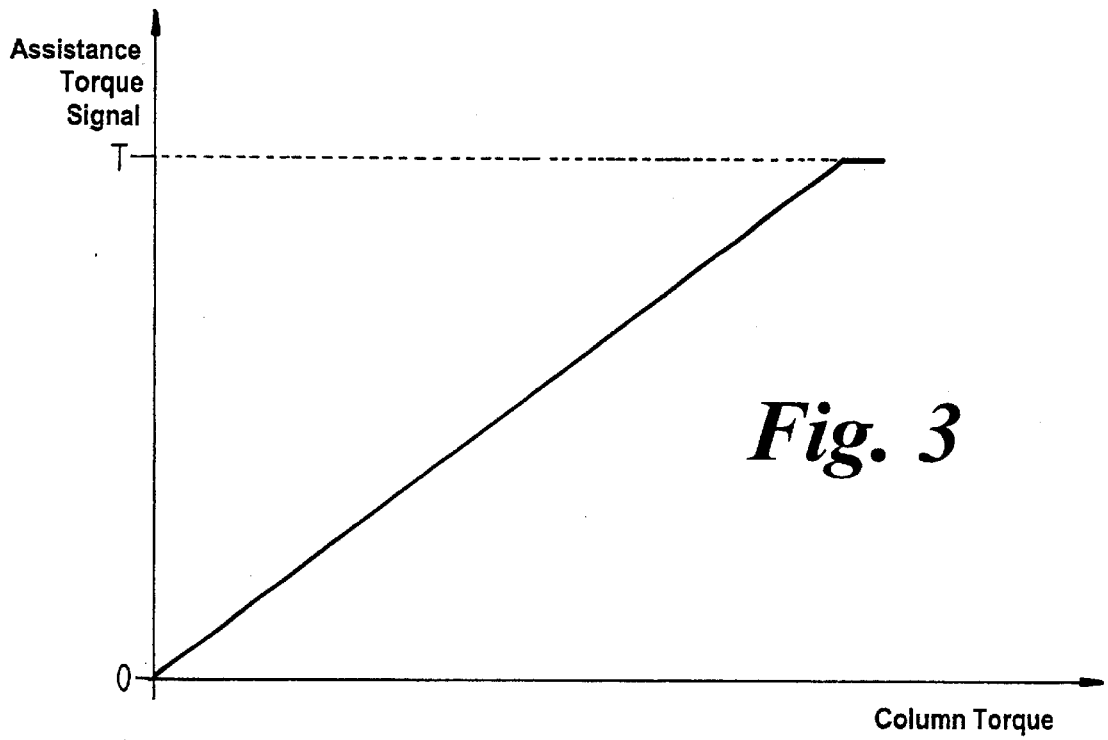
FIG. 3 illustrates the relationship between the torque applied by the driver and the assistance torque value generated.

The assistance torque signal 10 is derived as a function of the torque in the steering column as measured by the torque sensor 6. The relationship between the measured torque and the assistance signal is essentially linear as shown in the plot of FIG. 3. However, other possible relationships may be used to map the torque to the assistance signal. In both cases, as torque increases the magnitude of the assistance signal increases. It will also be understood that the assistance torque signal 10 may be dependent upon other parameters such as vehicle speed if required. In that case it is typical to reduce the value of the assistance torque signal 10 at high speeds to enhance stability and increase it at very low speeds to ease parking manoeuvres.

Figure 4:
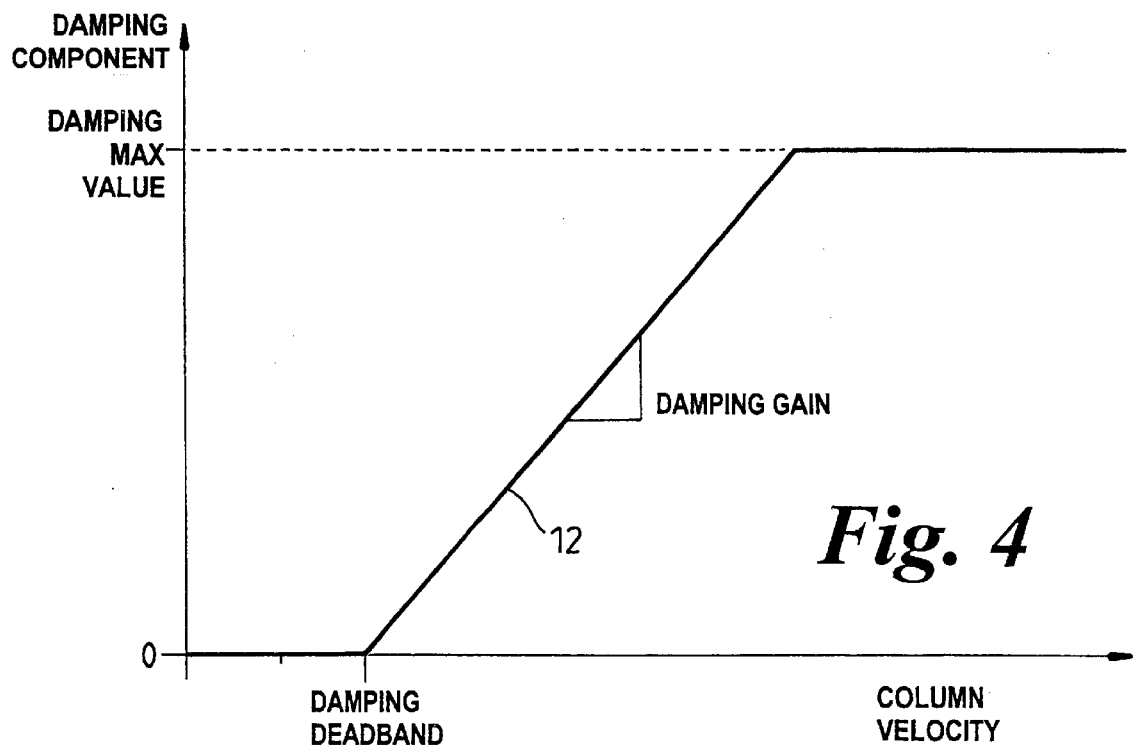
FIG. 4 illustrates the relationship between the damping component and the column velocity.

The damping component is produced as a function of both the measured torque and column velocity. As shown in FIG. 4, an intermediate damping signal 12 is produced as a linear function of column velocity. The intermediate damping signal 12 increases in value from zero at zero column velocity to a maximum value at a predetermined column velocity (typically 2 revolutions per second). Of course, for different applications both the peak damping value and the velocity corresponding to this value may be varied. Above 2 revolutions per second the intermediate damping signal value remains constant. A deadband is also provided around zero velocity which may be of variable width. Thus, the value of the damping component remains at or about zero for a range of velocities within the deadband.

Figure 5:
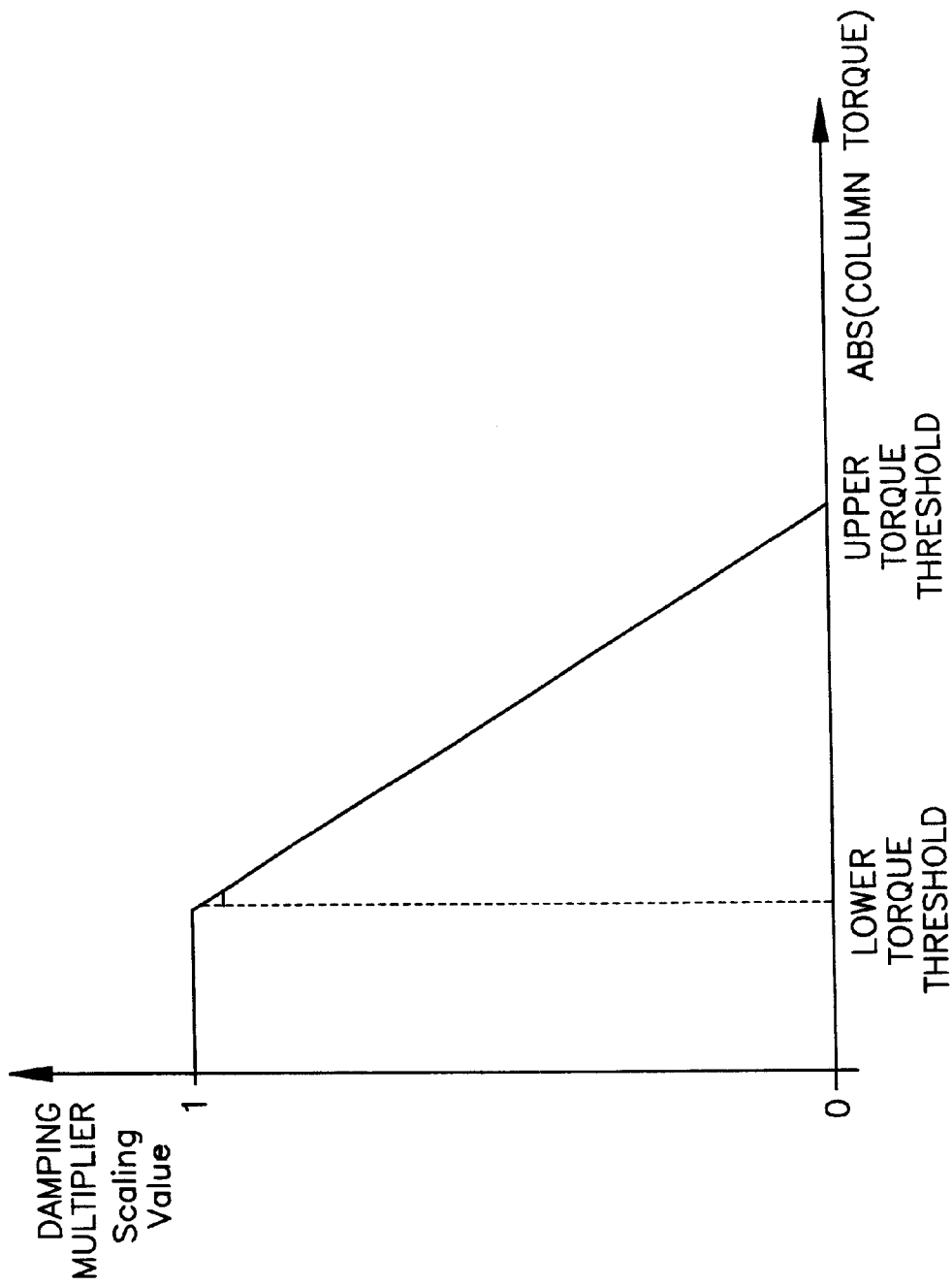
FIG. 5 illustrates the relationship between the value of the damping component and driver applied torque.

The intermediate damping signal 12 is then modified as a function of torque by calculating a scaling value 13. As shown in FIG. 5 of the accompanying drawings, the scaling value 13 is a fractional value that is a function of torque carried by the steering column. The scaling value increases from unity at zero applied torque to zero at a predetermined threshold applied torque. A deadband is also provided whereby the scaling value remains at or around unity for small torque values around zero torque. The width of the deadband is preferably chosen to exceed the maximum torque that can arise due to inertia in the system.

The intermediate signal 12 is next multiplied by the scaling factor signal 13 in order to produce the damping component 11. Finally, the signal processor subtracts the damping component 11 from the assistance torque signal 10 to produce the torque demand signal 8 used to drive the electric motor 1.

Figure 6:
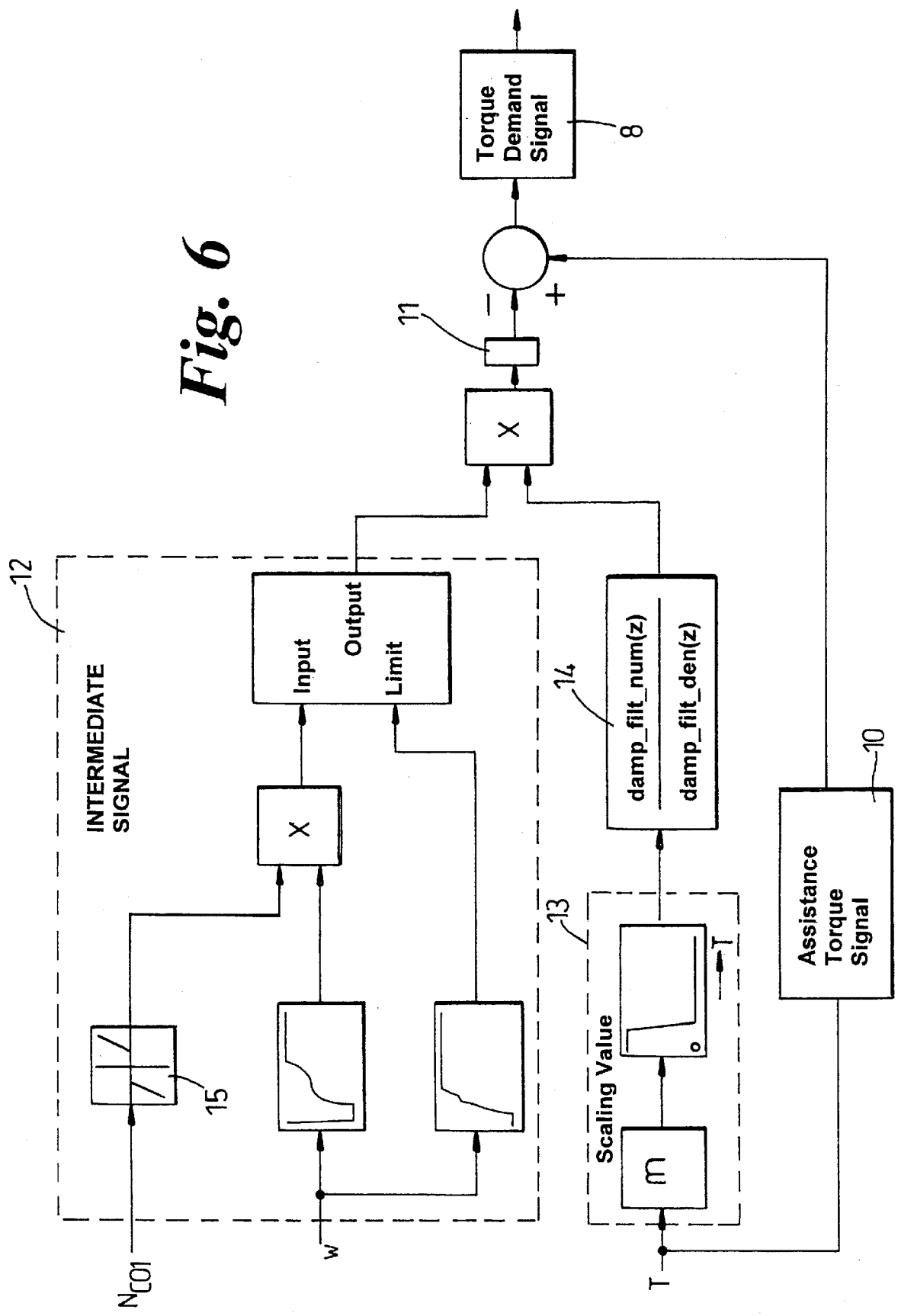
FIG. 6 is a block diagram illustrating an alternative set of functional steps undertaken with the signal processing unit of the system of FIG. 1.

A refinement is illustrated in the block diagram of FIG. 6. In this arrangement, three input values are passed to the signal processor: column velocity ω, column angular position Ncol and column torque T.

As in the arrangement of FIG. 2, the measured torque is used to produce an assistance torque signal 10 in the manner illustrated in FIG. 3 of the accompanying drawings.

The damping component is also produced as a function of both the measured torque and the column velocity. However, in this arrangement two main differences can be noted as follows:

(a) The torque value T is processed to produce a scaling value 13 as for the first embodiment but this is subsequently passed through a low-pass filter 14 to remove any high-frequency torque dependent variations in value prior to combining with the intermediate signal 12 to produce the damping component; and (b) The intermediate signal 12 is produced as a function of both column velocity ω and column absolute angle position Ncol to introduce a position dependent deadband 15 about the straight ahead position of the steering column.

The low-pass filter 14, which in this embodiment has a cut-off frequency of 3 Hz, removes the effect of high speed variation in driver applied torque combing with subsequent high frequency variations in damping component. In certain circumstances, without the presence of the low-pass filter, unwanted vibrations may be produced in the steering column.

The filter may be implemented in a variety of ways which will be readily appreciated by the person skilled in the art. A suitable frequency domain filter may be of the form:

$$X = \frac{damp - first - numerator(Z)}{damp - first - denominator(Z)}$$

where X is the filtered scaling value.

What is claimed is:

1. An electric power assisted steering assembly comprising a steering mechanism which operatively connects a steering wheel to roadwheels of a vehicle, a torque sensor adapted to produce a first output signal indicative of a torque T carried by a portion of said steering mechanism, an angular velocity sensing sensor for producing a second output signal indicative of an angular velocity of said portion of said steering mechanism, an electric motor operatively connected to said steering mechanism, a signal processing unit adapted to receive said first output signal and said second output signal and to produce a torque demand signal representative of an assistance torque to be applied to said steering mechanism by said motor, and a motor drive stage adapted to provide a drive current to said motor responsive to said torque demand signal, and in which said torque demand signal includes a damping component that is dependent upon both said first output signal and said second output signal, wherein said damping component is filtered to remove high frequency variations in said damping component caused by high frequency changes in said column torque.

2. An electric power assisted steering assembly according to claim 1, wherein said portion of said steering mechanism comprises a steering column and a value of said damping component has a magnitude which increases over a range of velocities of steering column bounded by a first steering column velocity and a second, higher, steering column velocity.

3. An electric power assisted steering assembly according to claim 2, wherein said first steering column velocity corresponds to zero velocity of said steering column.

4. An electric power assisted steering assembly according to claim 2, wherein a deadband is provided whereby said value of said damping component remains at or about zero over a range of velocities bounding zero velocity.

5. An electric power assisted steering assembly according to claim 4, wherein a width of said deadband is varied in use as a function of speed of said vehicle.

6. An electric power assisted steering assembly according to claim 2, wherein said magnitude of said damping component value increases linearly as a function of velocity of said column over the whole or a part of said range of steering column velocity values.

7. An electric power assisted steering assembly according to claim 2, wherein said magnitude of said damping component between said first and second steering column velocity values increases at a rate which decreases as a function of applied torque.

8. An electric power assisted steering assembly according to claim 1, wherein said signal processing unit is adapted to generate a scaling value that is a function of torque, generate an intermediate damping value that is a function of column velocity, and multiply said scaling value with said damping value to produce said damping component.

9. An electric power assisted steering assembly according to claim 8, wherein said scaling value varies from a maximum value at zero applied torque to a minimum value at a predetermined maximum applied torque.

10. An electric power assisted steering assembly according to claim 8, wherein said scaling value is substantially zero valued over a range of measured torque values bounding zero torque.

11. An electric power assisted steering assembly according to claim 1, wherein said torque demand signal includes an assistance torque signal that is a function of torque in said steering mechanism.

12. An electric power assisted steering assembly according to claim 11, wherein said signal processing unit is adapted to combine said damping component with said assistance torque signal to produce said torque demand signal.

13. An electric power assisted steering assembly according to claim 1, wherein a lower pass filter is provided which filters said damping component.

14. An electric power assisted steering assembly according to claim 8, in which said scaling value is low-pass filtered prior to multiplication by said intermediate damping value to generate said damping component.

15. An electric power assisted steering assembly comprising a steering mechanism which operatively connects a steering wheel to roadwheels of a vehicle, a torque sensor adapted to produce a first output signal indicative of a torque T carried by a portion of said steering mechanism, an angular velocity sensing sensor for producing a second output signal indicative of an angular velocity of said portion of said steering mechanism, an electric motor operatively connected to said steering mechanism, a signal processing unit adapted to receive said first output signal and said second output signal and to produce a torque demand signal representative of an assistance torque to be applied to said steering mechanism by said motor, and a motor drive stage adapted to provide a drive current to said motor responsive to said torque demand signal, and in which said torque demand signal includes a damping component that is dependent upon both said first output signal and said second output signal, wherein said signal processing unit is adapted to generate a scaling value that is a function of torque, generate an intermediate damping value that is a function of column velocity, and multiply said scaling value with said damping value to produce said damping component in which a limiting means is provided which is arranged to limit a rate of change of said scaling value over time.

16. An electric power assisted steering assembly according to claim 15, wherein said damping component is filtered to remove high frequency variations in said damping component caused by high frequency changes in said column torque.

17. An electric power assisted steering assembly according to claim 16, wherein a lower pass filter is provided which filters said damping component.

18. An electric power assisted steering assembly according to claim 15, in which said scaling value is low-pass filtered prior to multiplication by said intermediate damping value to generate said damping component.

19. An electric power assisted steering assembly according to claim 15, wherein said portion of said steering mechanism comprises a steering column and a value of said damping component has a magnitude which increases over a range of velocities of steering column bounded by a first steering column velocity and a second, higher, steering column velocity.

20. An electric power assisted steering assembly according to claim 19, wherein said first steering column velocity corresponds to zero velocity of said steering column.

21. An electric power assisted steering assembly according to claim 19, wherein a deadband is provided whereby said value of said damping component remains at or about zero over a range of velocities bounding zero velocity.

22. An electric power assisted steering assembly according to claim 21, wherein a width of said deadband is varied in use as a function of speed of said vehicle.

23. An electric power assisted steering assembly according to claim 19, wherein said magnitude of said damping component value increases linearly as a function of velocity of said column over the whole or part of said range of steering column velocity values.

24. An electric power assisted steering assembly according to claim 19, wherein said magnitude of said damping component between said first and second steering column velocity values increases at a rate which decreases as a function of applied torque.

25. An electric power assisted steering assembly according to claim 15, wherein said scaling value varies from a maximum value at zero applied torque to a minimum value at a predetermined maximum applied torque.

26. An electric power assisted steering assembly according to claim 15, wherein said scaling value is substantially zero valued over a range of measured torque values bounding zero.

27. An electric assisted steering assembly according to claim 15, wherein said torque demand signal includes an assistance torque signal that is a function of torque in said steering mechanism.

28. An electric power assisted steering assembly according to claim 27, wherein said signal processing unit is adapted to combine said damping component with said assistance torque signal to produce said torque demand signal.

* * * * *